(12) United States Patent
Furusawa et al.

(10) Patent No.: US 6,357,903 B1
(45) Date of Patent: **\*Mar. 19, 2002**

(54) LINE TYPE ILLUMINATOR

(75) Inventors: Satoshi Furusawa; Tomihisa Saito, both of Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/546,415

(22) Filed: Apr. 10, 2000

(30) Foreign Application Priority Data

Apr. 16, 1999 (JP) ............................. 11-108934

(51) Int. Cl.[7] .................... F21V 8/00; G02B 27/14
(52) U.S. Cl. .................. 362/555; 362/552; 362/231; 362/31; 362/800; 358/475; 358/484
(58) Field of Search ................ 362/551, 552, 362/555, 583, 230, 231, 31, 27; 358/475, 509, 484; 250/216, 234, 227.11

(56) References Cited

U.S. PATENT DOCUMENTS

| | | | | |
|---|---|---|---|---|
| 5,214,536 A | * | 5/1993 | Prakash | 359/633 |
| 5,808,295 A | * | 9/1998 | Takeda et al. | 250/216 |
| 5,810,463 A | * | 9/1998 | Kawahara et al. | 362/31 |
| 6,017,130 A | * | 1/2000 | Saito et al. | 362/223 |
| 6,204,938 B1 | * | 3/2001 | Horiuchi et al. | 358/475 |
| 6,206,534 B1 | * | 3/2001 | Jenkins et al. | 362/31 |

FOREIGN PATENT DOCUMENTS

| | | |
|---|---|---|
| JP | 6-148435 | 5/1994 |
| JP | 7-14414 | 1/1995 |
| JP | 7-183994 | 7/1995 |
| JP | 8-163320 | 6/1996 |
| JP | 8-172512 | 7/1996 |
| JP | 10-126581 | 5/1998 |

* cited by examiner

*Primary Examiner*—Thomas M. Sember
(74) *Attorney, Agent, or Firm*—Merchant & Gould P.C.

(57) ABSTRACT

A line type illuminator comprising a plurality of light sources at a side of one end of a rod-like transparent light guide, wherein an auxiliary light scattering pattern is formed with two (2) spot-like patterns, which are provided at positions being shifted from a center line of a main light scattering pattern in the longitudinal direction and are separate in a width direction, for maintaining evenness or uniformity of illumination intensity in a longitudinal direction. Normal lines of those two (2) spot-like patterns and the center line of any one of the plurality of light sources, extending in the longitudinal direction, intersect each other. Specifically, the longitudinal center lines of the red-color light sources and the green-color light source intersect the respective normal lines of the spot-like patterns 21*a* and 21*a*.

9 Claims, 9 Drawing Sheets

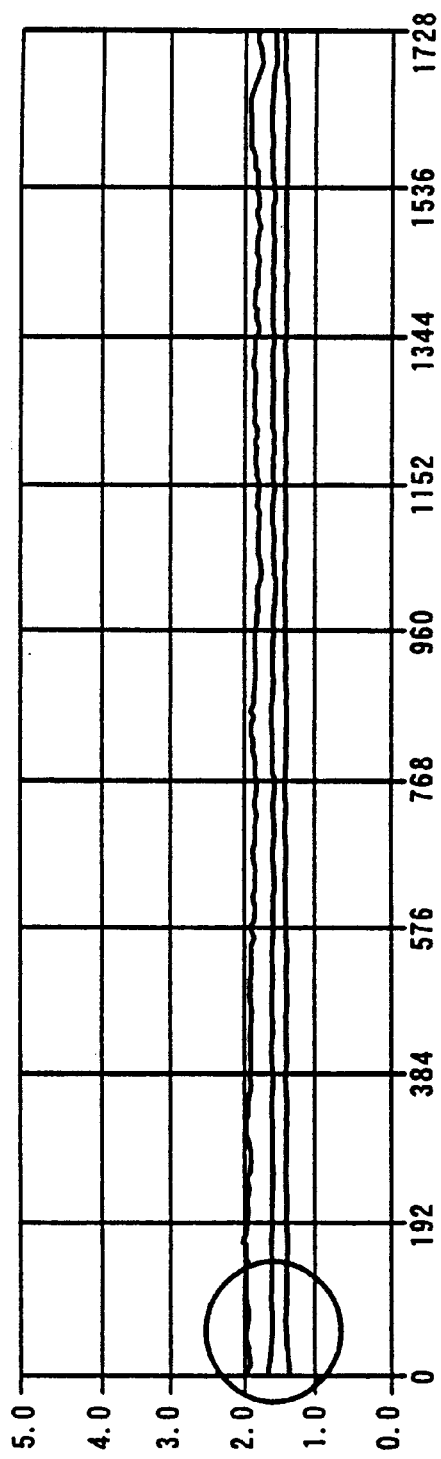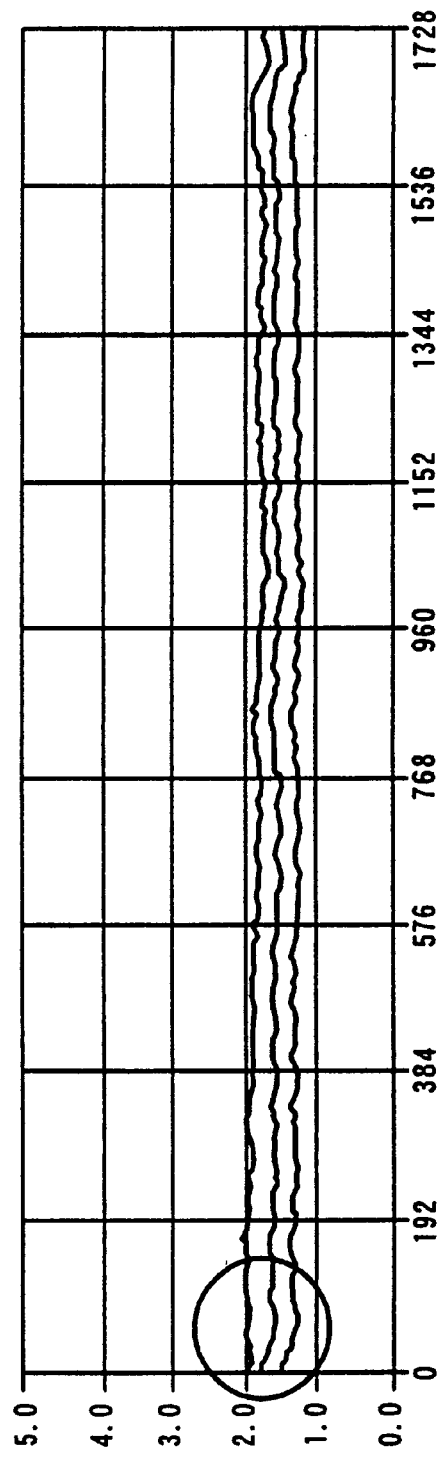

LINE TYPE ILLUMINATOR

BACKGROUND OF THE INVENTION

1. Field of the Invention

The present invention relates to an illuminator of a line type to be used in or installed into an image reading apparatus for use in, for example, a facsimile machine, a copy machine, an image scanner, etc.

2. Description of Related Art

In machines such as facsimile machines, copy machines, image scanners, etc., as a device for reading a manuscript or image, there is applied an image reading apparatus, such as an image sensor, etc. Known types of image sensors are, for example, the reduced type, the close-contact type, the full-contact type, etc. Among them, image sensors of the contact type are normally constructed with an illuminator, an optical device of an equal power for imaging or equimultiple imaging, a sensor, and so on.

The image sensor of the close-contact type, in general, has a short light path, compared to that of the image sensor of the reduced type, thereby allowing for an apparatus of small size, and rendering unnecessary any troublesome optical adjustment, therefore there is a merit or advantage to such an image sensor in that it can be installed with ease into an apparatus. For these reasons, it has come to be applied in many apparatus, in the place of the reduced type.

The illuminator installed in the image sensor of the close-contact type must illuminate the surface of the manuscript with an intensity of illumination higher than that for enabling to read or pick up of images thereon by means of the sensor(s). The area to be illuminated by the illuminator is in a line-like shape. Specifically, it is very long in a main scanning direction (i.e., a longitudinal direction), while it may be very narrow in a sub-scanning direction thereof being orthogonal to the main scanning direction thereof. For example, in the illuminator for use in an A4 size machine which is applied to the facsimile apparatus, the length in the longitudinal direction must be 216 mm or longer. A further necessary attribute of the illuminator is uniformity of illumination. Unevenness in the illumination intensity on the surface of the manuscript, particularly in the longitudinal direction, may cause error(s) in reading of the image(s), therefore it is desirable for the intensity of illumination to be as uniform or even as possible.

As such the illuminator, conventionally, there is already known an illuminator of an LED array type, in which a few or several tens (for example, 30 pieces) of the LEDs (Light Emitting Diodes) are mounted on a printed circuit board by means of wire-bonding or soldering in a line. And, in the close-contact type image sensor being installed with such the illuminator therein, the light irradiated from the illuminator is incident upon the manuscript to be read after passing through a cover glass which functions also as a support for the manuscript, and then the light reflected from the surface of the manuscript is received by photoelectric transducer elements through a rod lens array, so as to be read as the image thereof.

In such the conventional apparatus, in which a large number of LEDs are aligned, the light being actually utilized in the process of sensing an image on a manuscript is only the portion which is incident upon a narrow reading line on the manuscript to be read, but the light falling outside of this portion is not utilized. Also, there is a method in which the illuminator is brought to be as close as possible to the manuscript to be read, to make the intensity of illumination of the line of the manuscript as bright as possible, thereby to reduce the number of the LEDs necessary to be installed, however in such a case there occurs a significant lack of evenness in the intensity of illumination. Also, in the illuminator having such a structure, there occurs a lack of evenness in the amount of light in a degree varying with a pitch of mounting of the LEDs. Further, inadequate uniformity may occur in the relative brightness of the individual LEDs used due to non-uniformity in the manufacturing thereof. Accordingly, if the number of the LEDs mounted onto an illuminator is reduced, the unevenness of the intensity and distribution of light emitted upon the reading line of the manuscript to be read becomes large.

In response to the above aspect of the design and manufacture of image reading apparatus, by the same inventors of the present invention there was proposed a technology according to which the light emitting elements (i.e., the LEDs) are provided at both end portions of a transparent body in a rod-like shape, and wherein a portion of surfaces of the transparent body is formed as a light scattering surface as, for example, in Japanese Laid-Open Patent No. Hei 6-148435 (1994) and Japanese Laid-Open Patent No. Hei 7-14414 (1995).

Since the light emitting elements are provided at both end portions of the transparent body of the rod-like shape in the line illumination apparatus disclosed in those publications, it is possible to eliminate one of the provided light emitting elements. The same inventors of the present invention also proposed a line illumination apparatus wherein the light emitting element is provided only at one end portion of the rod-like transparent body as, for example, in Japanese Laid-Open Patent No. Hei 8-163320 (1996) and Japanese Laying-Open Patent No. Hei 8-172512 (1996). The line illumination apparatus disclosed in those publications can obtain a reduction of cost by arranging the light emitting element only at the one end of the rod-like transparent body, and at the same time by making the shape of the light scattering pattern which is formed on the surface of the rod-like transparent body whereby the light irradiated from the light emitting elements expands from one end, upon which the light is incident, to the other end gradually, in the area of the light scattering pattern, for the purpose of obtaining an even or uniform illumination intensity along the longitudinal direction thereof.

Previously, in Japanese Laid-Open Patent No. Hei 7-183994 (1995), there was disclosed an image reading apparatus having an illumination means, which has at least two light sources each being different in the light emitting wavelength thereof, wherein the light sources are disposed with their alignments being shifted from a normal line passing through a center of a scattering and reflection region, so that the light comes to be incident in a uniform amount upon the scattering and reflection region, in the longitudinal direction thereof.

Further, the same inventors of the present invention disclosed the following, in Japanese Laid-Open Patent No. Hei 10-126581 (1998).

Namely, in a line type illuminator being provided with a light source at one end portion, the other end portion of a light guide being a rough surface, a light scattering pattern is devised so that the incident light is consumed as the illumination light until it reaches the other (non-emitting) end portion, thereby enabling that the illumination intensity may be maintained to be high and uniform.

However, with the line type illuminator mentioned in the above, inherent problems of reading of, in particular, a color manuscript, have not been studied.

Namely, when reading the color manuscript, the light emitting elements (for example, the LEDs), each emitting light at a different wavelength (for example, wavelengths corresponding to RGB), are energized one by one, so as to detect the intensity of reflection light in the respective wavelengths by means of sensors.

Taking the minimum light source for color into a consideration, there can be considered a light source constructed with three (3) LED chips, each having a different emission wave-length. There is a need of miniaturizing the image reading apparatus. Therefore, there is also the need of miniaturizing the line type illuminator for use therein.

If applying the above-mentioned light source constructed with the three (3) LED chips, each having the different emission wave-length, in the line type illuminator which is disclosed in the above-mentioned Japanese Patent Laid-Open No. 10-126581 (1998), the following aspects may be further improved.

Depending upon the dispositions of the LEDs which are energized separately, there is a necessity for improving the uniformity of the illumination intensity, in particular in the vicinity of the light source.

This can be considered because, in the vicinity of the light source, a positional and angular relationship between the LEDs to be lit and the illumination light scattering pattern and further the former's relationship with an outgoing surface thereof are changed. As the LED chips are of insubstantial size, it is therefore impossible to position them at substantially the same position.

SUMMARY OF THE INVENTION

An object of a device according to the present invention, with a line type illuminator that employs a plurality of light sources, each having a different light emission wave-length, the light sources are positioned only at one end of the illuminator, is to provide a inexpensive light illuminator that maintains uniformity in illumination intensity in the longitudinal direction thereof.

According to the present invention, there is provided a line type illuminator, having a scanning direction in a longitudinal direction, and a sub-scanning direction being orthogonal to the scanning direction and being narrow in a width thereof, comprising:

- a light source unit being constructed with a plurality of light sources, each of which can be activated independently;
- a rod-like transparent light guide, having a reflective surface opposing the light source unit at an end in the longitudinal direction thereof; and
- a case, in which the rod-like transparent light guide is received, wherein the rod-like transparent light guide is formed to have a polygonal cross-section thereof, a chamfered portion formed as a light emission surface and formed in the longitudinal direction at a corner thereof, and a main light scattering pattern formed in a portion intersecting a normal line of the light emission surface and opposing thereto, wherein,
- an auxiliary light scattering pattern is provided between the main light scattering pattern and the light source unit, and the auxiliary light scattering pattern is shifted outside from a center line of the main light scattering pattern in the longitudinal direction thereof, and further a normal line in a region of the auxiliary light scattering pattern intersects a center line of any one of the plurality of light sources, extending in the longitudinal direction.

And, according to the present invention, the auxiliary light scattering pattern mentioned above can be considered to be formed with two spot-like patterns which are provided separately in a width direction of said rod-like transparent light guide. However, the number of the spot-like patterns may be three (3) in total.

Also, according to the present invention, the other end surface of the above-mentioned rod-like transparent light guide may have a rough surface. Such a rough surface can be manufactured with ease, however the light incident upon the rough end surface is hardly reflected because of the rough surface thereof. A white paint is therefore applied upon the rough surface to reflect light more effectively, thereby obtaining a further utilization of the light emitted by the light sources.

Further, according to the present invention, the center line of the main light scattering pattern in the longitudinal direction thereof is shifted toward said chamfered portion from the center line of the rod-like transparent light guide, and the main light scattering pattern may have a first portion the width thereof gradually increasing from a minimum at the end where the light source unit is positioned toward a relative maximum at the other end thereof, a second portion which is continuous to said first portion and is increased in a width thereof, this width increasing in the same direction as and at a rate larger than that of said first portion, and a third portion which is continuous to said second portion and is extended toward the other end with a width being equal to a maximum width of said second portion.

With such a construction, it is possible to maintain a high intensity of illumination, and a high degree of evenness or uniformity thereof as well.

Further, according to the present invention, the first portion of said main light scattering pattern mentioned above may be formed with a portion in which light scattering patterns are formed discontinuously or spattered, and with another portion in which the light scattering patterns are formed continuously. In particular, in a case where the engaging portion in the concave and convex shape is formed in a portion of the rod-like transparent light guide, with the provision of a pattern omission portion corresponding to the concave and convex engaging portion, it is possible to maintain evenness of illumination.

BRIEF DESCRIPTION OF DRAWINGS

FIG. 9 is a graph showing a relationship between an intensity of illumination and a light scattering pattern in the embodiment; and FIG. 10 is a graph showing a relationship between the intensity of illumination and the light scattering pattern in an example for comparison.

DESCRIPTION OF THE PREFERRED EMBODIMENTS

Figure 1:
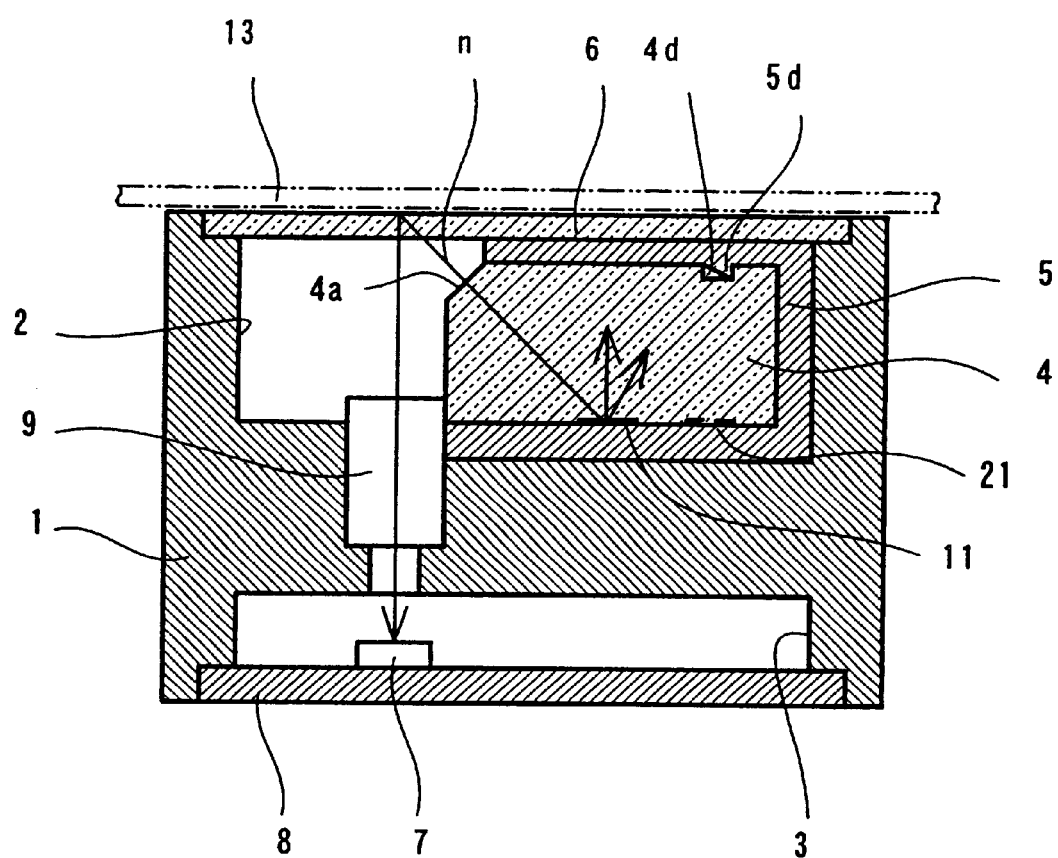
FIG. 1 is a cross-sectional view of a line type illuminator according to the present invention, section taken in a direction orthogonal to a scanning direction thereof.
Figure 2:
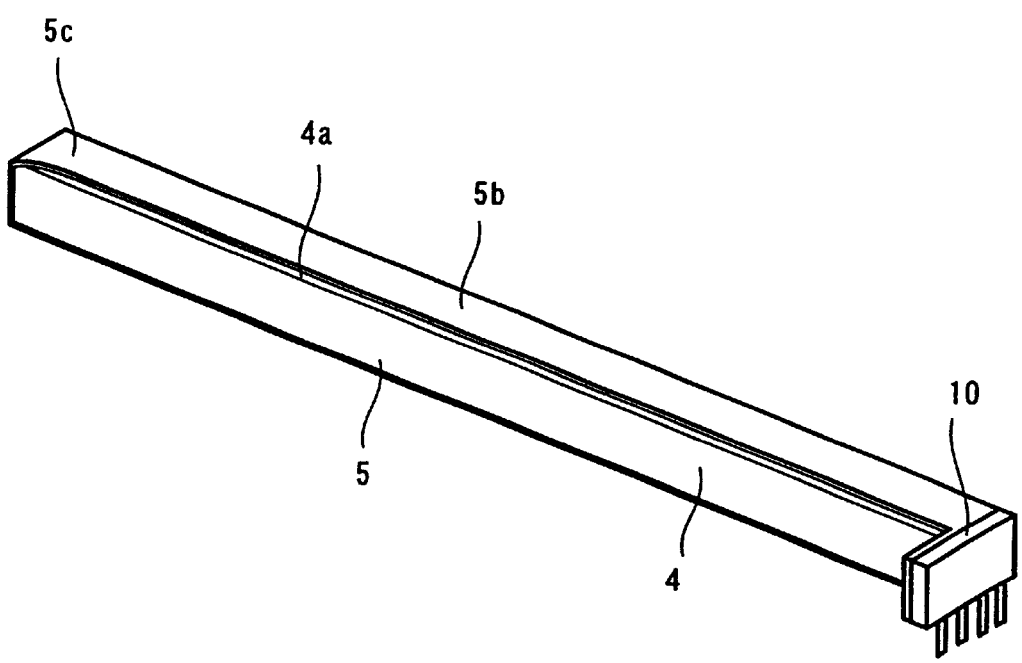
FIG. 2 is a perspective view of a case in which is received a rod-like transparent light guide constructing a portion of the same line type illuminator.
Figure 3:
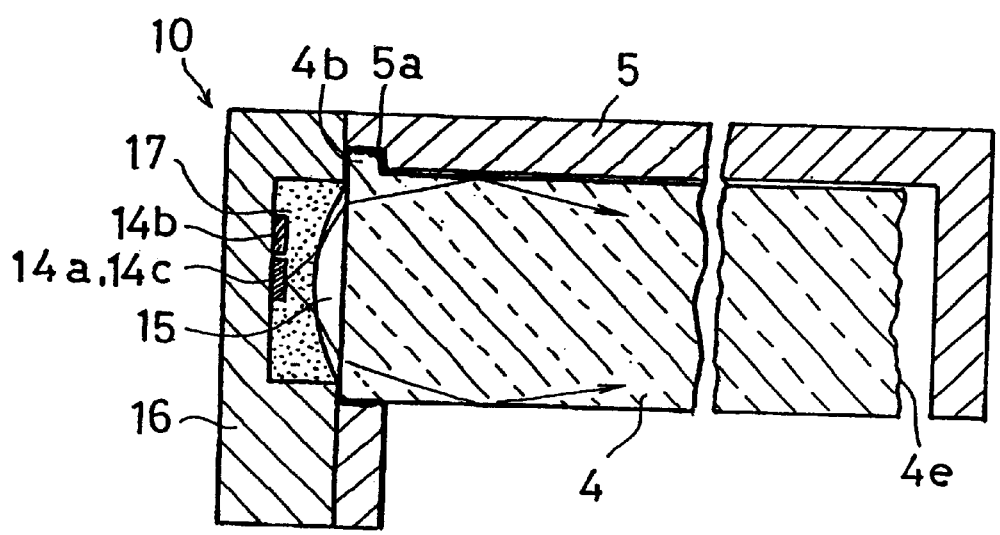
FIG. 3 is a cross-sectional view of the case receiving the rod-like transparent light guide therein, sectioned along the scanning direction thereof.
Figure 4:
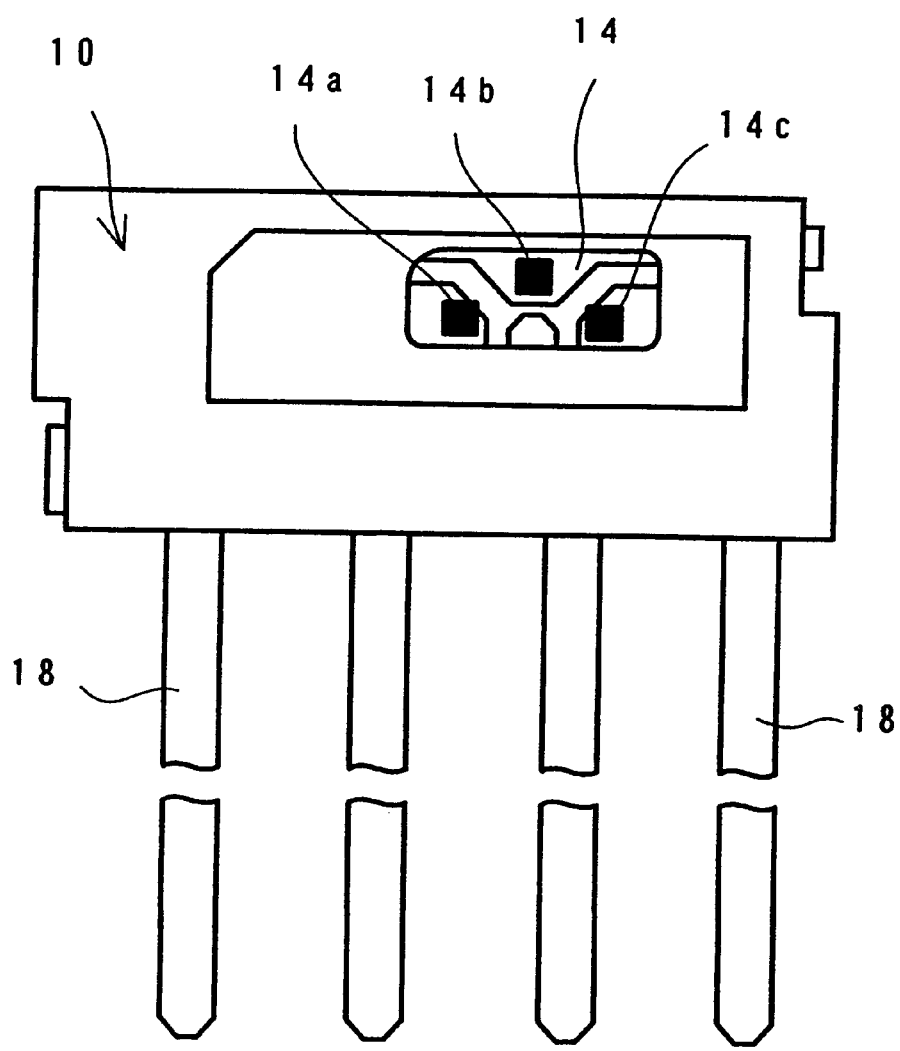
FIG. 4 is a view of an end surface of the case receiving the rod-like transparent light guide therein.
Figure 5:
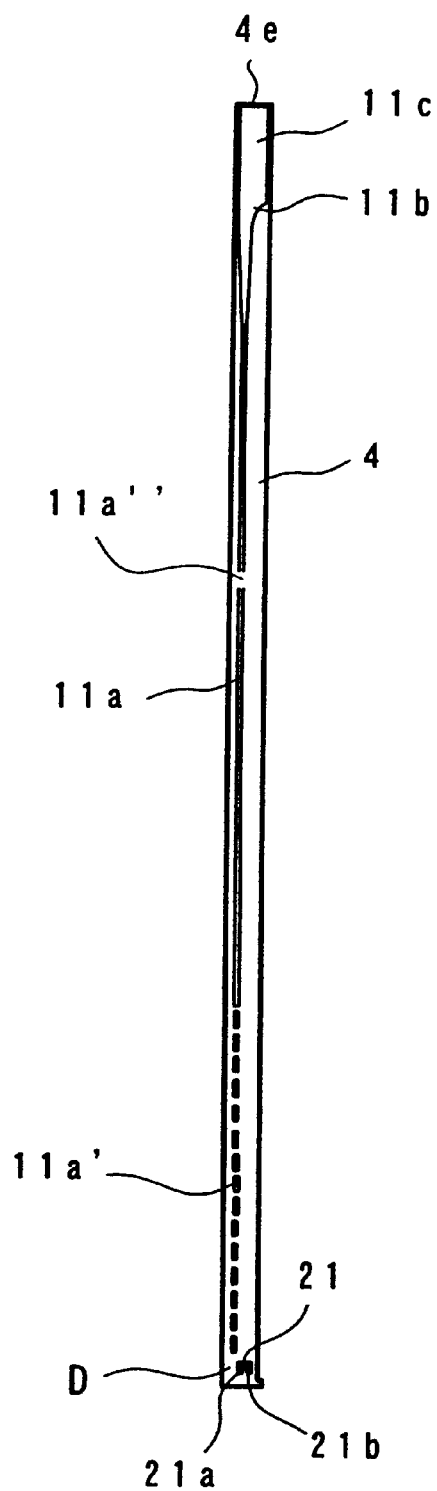
FIG. 5 is a view showing a surface on which a light scattering pattern of the rod-like transparent light guide is formed.
Figure 6:
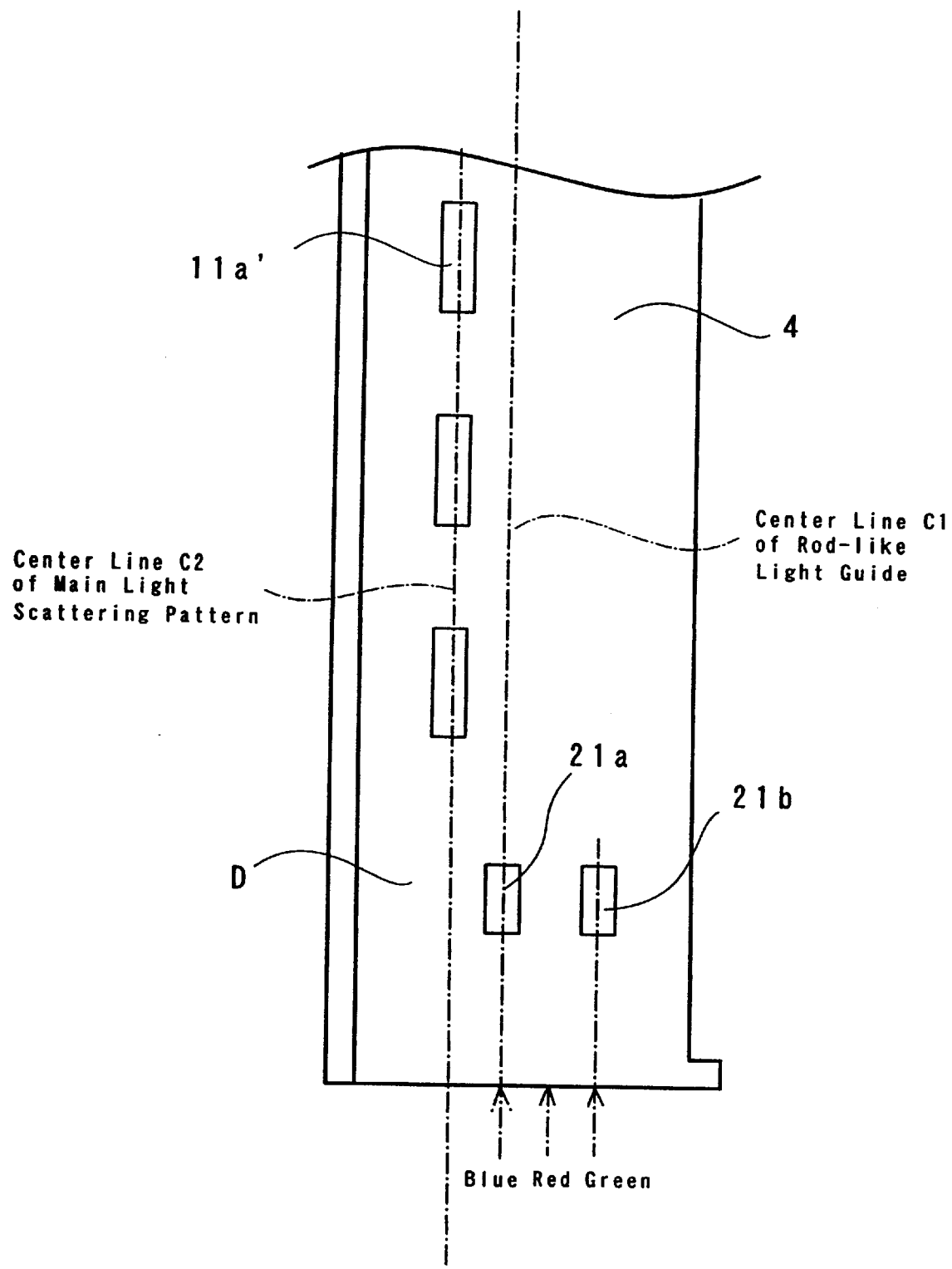
FIG. 6 is an enlarged view of a principle portion of the rod-like transparent light guide.
Figure 8:
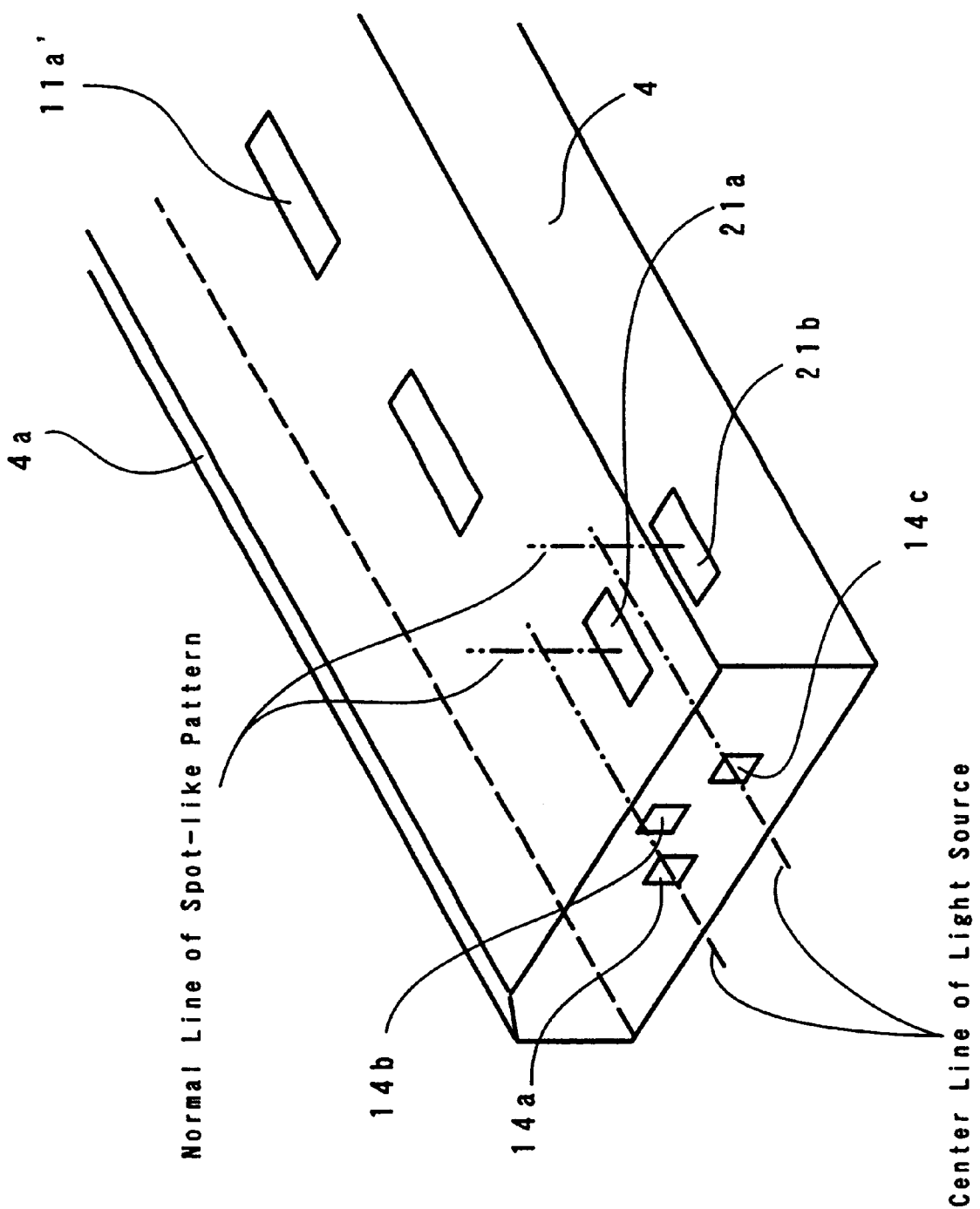
FIG. 8 is an enlarged view of a principle portion of the rod-like transparent light guide.

Hereinafter, detailed explanation of the embodiments according to the present invention will be given by referring to the attached drawings. Here, FIG. 1 is a cross-sectional view of a line type illuminator according to the present invention, being cut in a direction orthogonal to a scanning direction thereof; FIG. 2 is a perspective view of a case in which is received a rod-like transparent light guide constructing a portion of the same line type illuminator; FIG. 3 is a cross-sectional view of a the case receiving the rod-like transparent light guide therein, being cut along the scanning direction thereof; FIG. 4 is a view of an end surface of the case receiving the rod-like transparent light guide therein; FIG. 5 is a view showing a surface on which a light scattering pattern of the rod-like transparent light guide is formed; FIG. 6 is an enlarged view of a principle portion of the rod-like transparent light guide; and FIG. 8 is an enlarged view of a principle portion of the rod-like transparent light guide.

With a line type illuminator, concave portions 2 and 3 are formed in a frame 1, and within the concave portion 2 is disposed a case 5 receiving a rod-like transparent light guide 4 therein, while an opening portion of the concave portion 2 is closed by a glass plate 6. Within the concave portion 3 is attached a substrate 8 on which sensors 7 are provided, and further within the frame 1, a rod lens array 9 is held.

Therefore, the light emitting from a light source unit 10 which is attached at one end of the case 5 enters into the rod-like transparent light guide 4, and it is emitted from the rod-like transparent light guide 4 as scattered light, scattered by means of a main light scattering pattern 11 which is formed on one side surface of the rod-like transparent light guide 4. This emitted light is irradiated upon a manuscript 13. Light reflected by the manuscript 13 passes through the rod lens array 9 to then be detected by the sensors 7, whereby the manuscript is read or scanned.

In a portion of the rod-like transparent light guide 4 is formed a concave portion 4d, while a convex portion 5d is formed on an interior surface of the case 5, so as to be fit into that concave portion 4d, so that no portion of the light guide 4 is allowed to project outside the case, and so that this may be accomplished without using an adhesive.

Here, the material of the above-mentioned rod-like transparent light guide 4 is preferably a resin having high light transparency, such as an acrylic resin or polycarbonate, or an optical glass having high light transparency, or the like.

Also, the cross-sectional shape of the rod-like transparent light guide 4 is preferably pentagonal in which a chamfered portion 4a, as the light emission surface, is formed at one corner of an otherwise rectangular form thereof, however it may be a hexagon in which chamfered portions are formed at two (2) corners opposing to each other in the basic rectangular form thereof. Further, the shape of cross-section of the rod-like transparent light guide 4 may be formed as a heptagon by cutting an arbitrary three (3) corners of a rectangular form of the cross-section, or as an octagon by cutting all the corners thereof, each variation being functional provided that there are preserved two (2) sets of side surfaces opposing to each other in an original quadrilateral column.

The case 5, in which the rod-like transparent light guide 4 is received, is preferably made of a material having high reflectivity of light, therefore it is formed from a white resin in which is mixed a white coloring agent having high reflectivity, or from a material of another color, on the surface of which white paint is applied. Of course, the color is not restricted only to the white color, but various colors can be selected depending upon the wavelengths of the light to be used. Further, a metal plate having inherently high reflectivity, such as an aluminum plate or a stainless steel plate can be included, and it can be constructed in form of a mirror.

With such the construction, the light reflected by the interior surface of the case 5 reenters the transparent light guide 4, and it propagates within the transparent light guide 4. In this manner, covering the transparent light guide 4 with the material having as high a reflectivity as possible is helpful to realize the illuminator having the higher efficiency thereof.

Also, as shown in the FIG. 3, a projecting portion 4b is formed at the end portion of the rod-like transparent light guide 4 at the side of the light source unit 10, while a concave portion 5a is formed on the case 5, into which the projecting portion 4b is fitted or inserted. In this manner, by positioning the end portion at the side of the light source unit 10 with accuracy, an air layer 15, being defined between the light sources 14 of the light source unit 10 and the one end surface of the rod-like transparent light guide 4, is made constant in the thickness thereof.

Further, in a case where the case 5 is made of polycarbonate and the rod-like transparent light guide 4 is of transparent acrylic resin, when the materials are held at high temperature for a duration of time, for example at 80° C. for 24 hours, the case rarely contracts but the rod-like transparent light guide 4 may contract, and an aperture 19 is thereby caused between the inner wall of the case and a rough surface 4e at the other end of the rod-like transparent light guide 4. If such an aperture is caused, the light reaching to the rough surface 4e enters into the aperture therefrom and is reflected upon the interior surface of the case 5 to be turned back to the rough surface again. Compared to a case where there is no aperture caused, an amount of the lights reflected back within the rod-like transparent light guide 4 is less in the above-described case.

If white paint is applied onto the rough surface 4e, the decrease in the intensity of illumination, in particular in the vicinity of the rough surface, can be prevented, even in the case where components are left at high temperature.

The light sources (i.e., the LED chips) 14a, 14b and 14c are mounted on a print circuit board 16 by means of wire bonding technology, and further they are protected by a transparent epoxy resin 17 thereon. Reference numeral 18 indicates terminals thereof.

In the present embodiment, the light source 14a is a blue light source, the light source 14b a red light source, and the light source 14c is a green light source. The light sources 14a, 14b and 14c are disposed in the order or sequence of the arrangement thereof dependent upon the intensity of light emission thereby. Specifically, the blue light source 14a having the weakest light emission intensity is positioned to be nearest to the main light scattering pattern 11, while the green light source 14c having the strongest light emission intensity is farthest from the main light scattering pattern 11.

The light emitted from each of the light sources 14a, 14b and 14c enters into the rod-like transparent light guide 4 from one end thereof, however if the incident angle is too wide, a portion of the light passes out of the rod-like transparent light guide 4. With provision of the air layer 15 mentioned above, the widening angle of the light reflected toward the end of the rod-like transparent light guide 4 is suppressed, to thereby increase an efficiency of illumination.

Also, as shown in FIG. 2, an upper edge portion 5b of the case 5, facing to the chamfered portion 4a of the rod-like transparent light guide 4, is drawn back from a lower edge portion thereof, so as not to prevent the escape of the light. S However, the upper edge portion 5c comes out into the side of the chamfered portion 4a, in the vicinity of the other end portion being opposite to the light source unit 10, so as not to emit noise light therefrom.

Next, explanation will be given of the light scattering patterns which are formed on one side surface of the rod-like transparent light guide 4, with reference to FIGS. 5 through 8. Here, FIG. 5 is a view showing a surface on which the light scattering pattern of the rod-like transparent light guide is formed; FIG. 6 is an enlarged view of the principle portion of the rod-like transparent light guide; and FIG. 8 is an enlarged view of the principle portion of the rod-like transparent light guide.

The main light scattering pattern 11 is formed by applying white paint thereon, however the color should not be restricted only to white, but various colors can be selected depending upon the wavelengths of the lights to be used. For example, light having a wavelength of 570 nm is mainly used in facsimile machines, therefore the color corresponding to the wavelength may be used in the apparatus for such a device. Also, the light scattering pattern may be formed by applying the paint thereon, and also by attaching a film having a predetermined color.

The shape of the main light scattering pattern 11 includes a first portion 11a, the area (width in the direction of scanning) of which is gradually increased from one end, at which the light source unit 10 is disposed, toward the other end, a second portion 11b being continuous with the first portion 11a and greater than the first portion 11a in a ratio of increase in the area (width) toward the other end thereof, and a third portion 11c being continuous with the second portion 11b and extending toward the other end thereof with a width equal to the maximum width of the second portion.

A center line C2 of the first portion 11a is shifted toward the side of the chamfered portion 4a relative to the center line C1 of the rod-like transparent light guide 4. With such a construction, the light scatter pattern 11 comes to be disposed on a normal line n of the chamfered portion 4a (i.e., the light emitting surface of the light guide 4), and thereby the illumination intensity of the light passing out of chamfered portion 4a is increased.

Further, the first portion 11a is increased in the area thereof gradually, depending upon the distance from the end portion which abuts on the light source unit 10. And, the ratio of increase in the area thereof is so determined, that most of the incident light is scattered before falling upon the other end, causing the illumination intensity to be even or uniform in the longitudinal direction, thereby satisfying the necessary condition of the light passing through the chamfered portion 4a.

In the present embodiment, the first portion 11a is not in continuous belt-like form, but is constructed as a broken line or series of portions, with a plurality of block-like light scattering portions 11a', and there is further provided a region D where no light scattering pattern is formed, between the end opposing to the light source unit 10 and the portion from where begins the first part or block-like light scattering portion 11a' of the first portion 11a.

The portion at the other side of the first portion 11a is continuous and belt-like in the form thereof, however a pattern omission portion 11a" is provided in a portion thereof. This pattern omission portion 11a" is provided at the position corresponding to the concave portion 4d of the rod-like transparent light guide 4.

If the concave portion 4d is provided there, the illumination intensity is partially increased by the light reflected from the concave portion 4d, however with the provision of the pattern omission portion 11a", it is possible to mitigate this so as to make uniform the illumination intensity.

Further, the pattern omission portion 11a" may be provided in any one of the first portion 11a, the second portion 11b and the third portion 11c, or alternatively all the first portion 11a may be provided in continuous and belt-like shape.

As mentioned in the above, when the first portion 11a is gradually increased in the area thereof, it is impossible to expand the side edge portion of the first portion 11a beyond a limit defined by the center line C2 which is eccentric. At such a portion which cannot be expanded, an additional portion is added to the pattern edge portion being opposite to it so as to maintain the area necessary to the pattern, thereby making this portion the second portion 11b of the light scattering pattern.

The second portion 11b is added with an imaginary expanse, therefore the area thereof is enlarged in area toward the other end of the rod-like transparent light guide 4, eventually reaching to the printable maximum width. And, from the portion reaching at the printable maximum width to the other end of the rod-like transparent light guide 4, the third portion 11c is formed with width being the maximum width.

Further, according to the present invention, on the same surface of the rod-like transparent light guide 4 on which the main light scattering pattern 11 is formed, an auxiliary light scattering pattern 21 is provided in the portion nearest to the light source unit 10.

This auxiliary light scattering pattern 21 is formed with two (2) spot-like patterns 21a and 21b which are provided separately in the width direction, at a position being shifted from the longitudinal center line of the above-mentioned main light scattering pattern 11.

The normal lines of the two (2) dot-like patterns 21a and 21b constructing the auxiliary light scattering pattern 21 are arranged so that the center line extending from any one of the above-mentioned plurality of light sources 14a, 14b and 14c in the longitudinal direction thereof intersects them. In the present embodiment, the center lines of the light source 14a of red color and the light source 14c of green color intersect the normal lines of the spot-like pattern 21a and 21.

Figure 7:
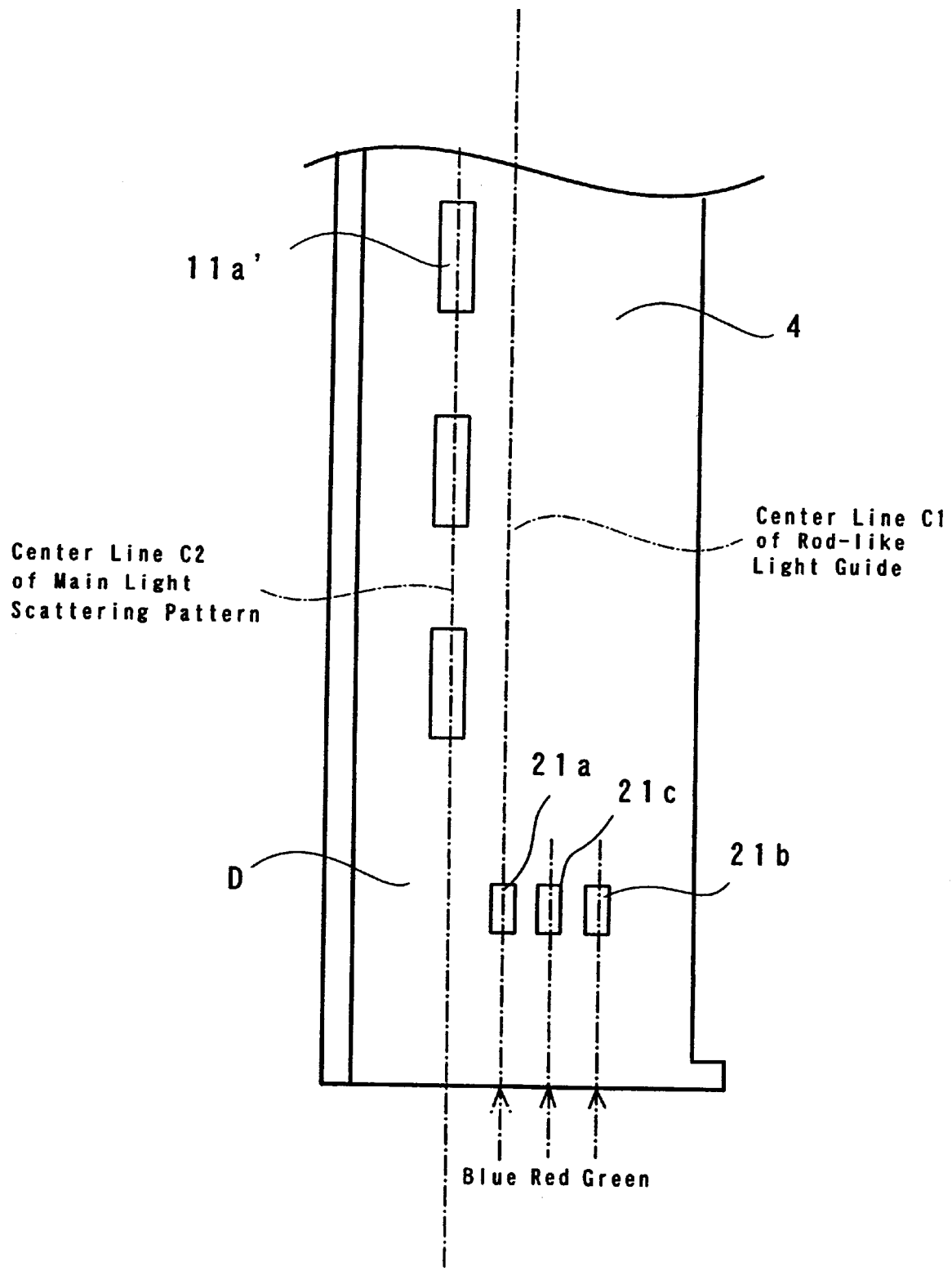
FIG. 7 is a view showing another embodiment in the same portion as shown in the FIG. 6.

The number of the spot-like patterns depends upon the respective light sources, as shown in the FIG. 7, and the spot-like patterns 21a, 21b and 21c may be so arranged that the normal lines of them intersect the center lines of the respective light sources, respectively.

Next, experimental results obtained on a relative intensity of illumination along with the full length of the light scattering pattern will be shown, making comparison between the embodiment and a comparable example.

Embodiment

The condition of the experiments is as follows:

Auxiliary light scanning pattern: yes;

Total length of the light scanning pattern: 172.8 mm; and

Intensity of illumination of incident lights: 650 $\mu$W.

Evaluations

In FIG. 9, the vertical axis indicates the relative intensity of illumination (V: voltage), while the horizontal axis indicates distance of the light scattering pattern from the light source, whereby it can be understood that the illumination intensity being even or uniform is obtained from one end portion of the rod-like transparent light guide to an other end portion thereof.

With reference to the red-color light source, the relative intensity of illumination is 1.443 V at the maximum value thereof and 1.175 V at the minimum value, and the average value thereof is 1.324 V; with the green-color light source, the relative intensity of illumination is 1.986 V at the maximum value and is 1.694 V at the minimum value, and the average value thereof is 1.850 V; and with the blue-color light source, the relative intensity of illumination is 1.054 V at the maximum value and is 0.912 V at the minimum value, and the average value thereof is 0.982 V.

COMPARABLE EXAMPLE

The condition of the experiments is as follows:
Auxiliary light scanning pattern: no;
Total length of the light scanning pattern: 172.8 mm; and
Intensity of illumination of incident lights: 650 μW.

Evaluations

In FIG. 10, as in FIG. 9, the vertical axis indicates the relative intensity of illumination (V: voltage), while the horizontal axis the distance of the light scattering pattern from the light source. Regarding the red-color light source, the relative intensity of illumination is 1.801 V at the maximum value thereof and 1.463 V at the minimum value, and the average value thereof is 1.590 V; with the green-color light source, the relative intensity of illumination is 2.053 V at the maximum value and is 1.673 V at the minimum value, and the average value thereof is 1.851 V; and with the blue-color light source, the relative intensity of illumination is 1.522 V at the maximum value and is 1.188 V at the minimum value, and the average value thereof is 1.306 V.

As shown in FIG. 10, even or uniform illumination intensity can be obtained in the region on the rod-like transparent light guide excluding the portion up to 10 mm from one end portion thereof, however in the region extending from the end portion where the light source is provided and extending 10 mm along the device (graph portion enclosed by a circle in the figure) the red-color light and the blue-color light are not even nor uniform. This corresponds to the portion where no auxiliary light scattering pattern, as disclosed in this invention, is provided.

As is fully explained in the above, with the line type illuminator according to the present invention, there is provided the main light scattering pattern at predetermined positions on the rod-like transparent light guide, and also the auxiliary light scattering pattern provided between the main light scattering pattern and the light source of the plurality of light sources, thereby enabling the device to maintain even or uniform intensity of illumination even though the light sources are disposed separately in the width direction of the rod-like transparent light guide.

What is claimed is:

1. A line type illuminator having a scanning direction in a longitudinal direction, and a sub-scanning direction being orthogonal to said scanning direction and being narrow in width thereof, comprising:
   a light source unit being constructed with a plurality of light sources, each of which can be activated independently;
   a rod-like transparent light guide, having a reflective surface opposing said light source unit at one end in the longitudinal direction thereof; and
   a case, in which the rod-like transparent light guide is received, wherein said rod-like transparent light guide is formed to have a polygonal cross-section thereof, a chamfered portion formed as a light emission surface and formed in the longitudinal direction at a corner thereof, and a main light scattering pattern formed in a portion intersecting a normal line of said light emission surface and opposing thereto, wherein
   an auxiliary light scattering pattern is provided between said main light scattering pattern and said light source unit, and said auxiliary light scattering pattern is shifted outside from a longitudinal center line of said main light scattering pattern, and further a normal line from the auxiliary light scattering pattern intersects a center line of any one of said plurality of light sources extending in the longitudinal direction.

2. A line type illuminator as defined in claim 1, wherein said auxiliary light scattering pattern is formed as a pattern of light-scattering discrete spots and is provided in a position corresponding to said plurality of light sources.

3. A line type illuminator as defined in claim 1, wherein said plurality of light sources comprises three light sources, and said auxiliary light scattering pattern is formed with two or three spot-like patterns being separated in a width direction of said rod-like transparent light guide.

4. A line type illuminator as defined in claim 1, wherein said rod-like transparent light guide of said main light scattering pattern has an engaging portion in a concave and convex shape, and is provided with a pattern omission portion corresponding thereto.

5. A line type illuminator as defined in claim 1, wherein the center line of said main light scattering pattern in the longitudinal direction thereof is shifted toward said chamfered portion relative to the center line of said rod-like transparent light guide, and wherein said main light scattering pattern has a first portion which is gradually increased in a width thereof, the width being at a minimum at a portion nearest to the end where the light source unit is positioned and being at a maximum at the other end thereof, a second portion which is continuous with said first portion and is increased in a width thereof, said width increasing in the same direction as and at a rate larger than that of said first portion, and a third portion which is continuous with said second portion and is extended toward the end opposing to the end having a light source, and having width equal to the maximum width of said second portion.

6. A line type illuminator as defined in claim 5, wherein the first portion of said main light scattering pattern is formed with a portion where light scattering patterns are formed discontinuously, and a portion where the light scattering patterns are formed continuously.

7. A line type illuminator as defined in claim 6, wherein said transparent light guide has an engaging portion in a concave and convex shape, and is provided with a pattern omission portion corresponding to said engaging portion in the concave and convex shape in a portion of said first portion of said main light scattering pattern, which portion is continuous to the main light scattering pattern.

8. A line type illuminator as defined in claim 1, wherein a rough surface is formed at the end surface of said rod-like transparent light guide.

9. A line type illuminator as defined in claim 8, wherein white paint is applied on the end surface of said rod-like transparent light guide.

* * * * *